J. P. METZGER

COMBINED PRESSURE REGULATING AND GOVERNING APPARATUS

Original Filed Jan. 14, 1920

WITNESSES

INVENTOR
JULES P. METZGER

ATTORNEYS

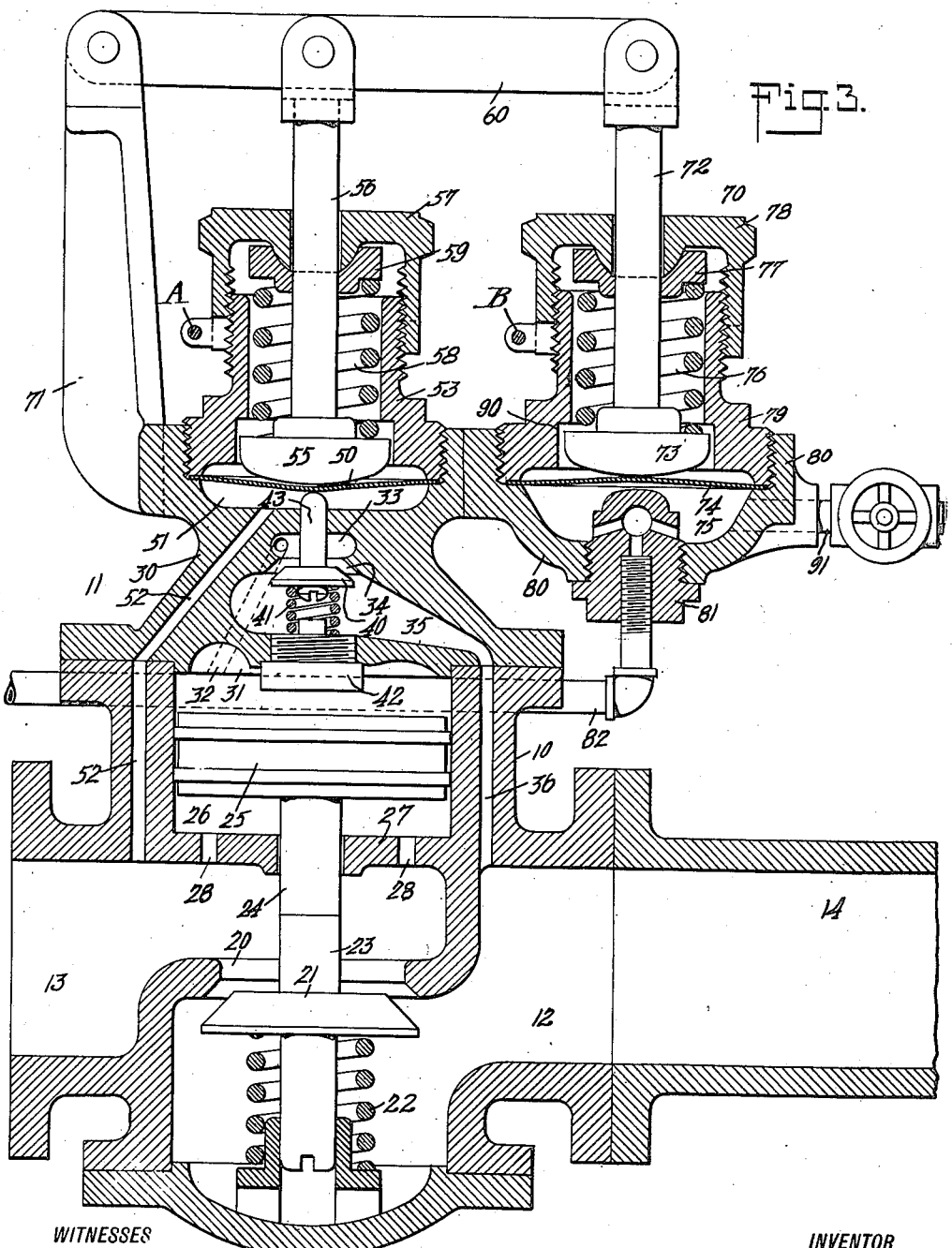

Patented Mar. 11, 1924.

1,486,782

UNITED STATES PATENT OFFICE.

JULES P. METZGER, OF CARLSTADT, NEW JERSEY, ASSIGNOR TO THE LESLIE COMPANY, OF LYNDHURST, NEW JERSEY, A CORPORATION OF NEW JERSEY.

COMBINED PRESSURE REGULATING AND GOVERNING APPARATUS.

Original application filed January 14, 1920, Serial No. 351,352. Divided and this application filed July 13, 1920. Serial No. 395,987.

*To all whom it may concern:*

Be it known that I, JULES P. METZGER, a citizen of the United States, and a resident of Carlstadt, in the county of Bergen and State of New Jersey, have invented a new and Improved Combined Pressure Regulating and Governing Apparatus, of which the following is a full, clear and exact description, this being a division of the application for Letters Patent of the United States, Serial No. 351,352, filed by me January 14, 1920, which has matured into Patent No. 1,369,690, granted to me Feb. 22, 1921.

The invention relates to pressure regulators such as shown and described in the Letters Patent of the United States, No. 1,244,226 and No. 1,308,638, granted to me on October 23, 1917, and July 1, 1919, respectively.

The object of the present invention is to provide a new and improved combined pressure regulating and governing apparatus arranged to insure the accurate functioning of the apparatus as a regulator, and after it has been set to a predetermined pressure, and to provide a governing function for co-ordinating or sub-controlling the regulator without interfering with the accuracy thereof in the performance of its work as a regulator.

Another object is to render the pressure regulating and governing apparatus exceedingly sensitive and dispensing entirely with packings, glands, stuffing boxes and other devices producing frictional resistance.

Another object is to permit of adjusting the governing device wholly independently of the regulating device.

Another object is to permit the regulating device to function wholly independently of the governing device in case of repairs or the like.

Another object is to provide a regulating and governing apparatus which is simple and durable in construction, easy of inspection and not liable to get easily out of order.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 3 is an enlarged sectional side elevation of improved combined pressure regulating and governing apparatus.

Figure 1:
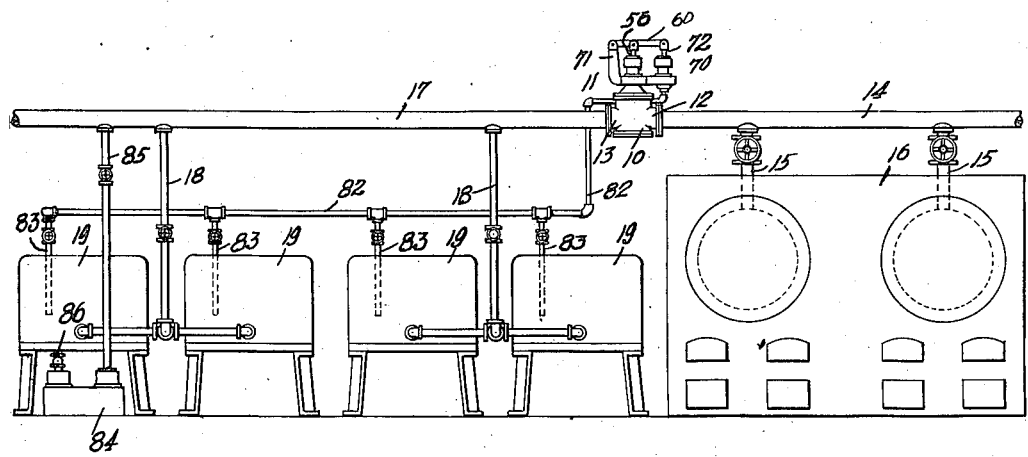
Figure 1 is a side view of the combined pressure regulating and governing apparatus as applied to the header of a battery of boilers feeding into a plurality of receivers intended to carry a constant pressure much lower than the boiler pressure.

The combined pressure regulating and governing apparatus presently to be described in detail relates to a general class of pressure regulators and governing devices in which the fluid delivered is at a predetermined pressure and the devices are intended for use in various developments of steam engineering service, and the improved apparatus applies wherever fluid pressure is to be delivered and governed. The apparatus is capable to be used in power plants, marine and naval engineering, also, in many cases, in industrial plants of various natures whereever steam is used to operate air compressors, pumps, etc., or for heating boiling apparatus such as steam vats, vacuum pans, etc. The improved apparatus is capable to be used, in some instances, for several purposes. It is intended as an automatic device but may be rendered semi-automatic only, or hand operated, should conditions require it. The apparatus may be reduced or reverted to perform solely the functions of an automatic pressure regulator. By this connection the fluid pressure chamber, which sub-controls and co-ordinates with the pressure regulator-proper and the regulator, may be shut off even manually without tampering with its predetermined setting of pressure.

The body 10 of the pressure regulator 11 is provided at one side with an inlet 12 and at the other side with an outlet 13, of which the inlet 12 is connected by a pipe 14 and valved branch pipes 15 with boilers 16 or other source of motive agent supply. The outlet 13 is connected by a pipe 17 and valved branch pipes 18 with receivers 19 to be supplied with steam under a lower pressure than that of the boilers 16. A valve seat 20 within the body 10 connects the inlet 12 with the outlet 13, and this valve seat 20 is controlled by a valve 21 normally held to its seat by a light spring 22. The upper end of the stem 23 of the valve 21 is connected with the stem 24 of a piston 25 mounted to reciprocate in a cylinder 26 formed within the body 10 and separated from the outlet by a horizontal partition 27 having openings or ports 28 to connect the lower end of the cylinder 26 with the outlet 13. The upper end of the cylinder 26 is closed by a cap 30 provided at the under side with a recess 31 connected by one or more ports 32 with a chamber 33 arranged in the cap 30. The chamber 33 is provided at the under side with a valve seat 34 opening into an expansion chamber 35 formed in the cap 30 and connected by a port 36 with the inlet 12 of the valve body 10. The valve seat 34 is normally closed by a controlling valve 40 extending within the expansion chamber 35 and pressed to its seat by a spring 41 seated on the top of a screw plug 42 screwing in the bottom of the expansion chamber 35. The upwardly extending arm 43 of the controlling valve 40 is engaged at its upper end by a diaphragm 50 held in a diaphragm chamber 51 arranged in the top of the cap 30 and connected by a port or opening 52 with the outlet 13 of the body 10. The diaphragm 50 is fastened in position by a nipple 53 screwed or otherwise secured to the top of the cap 30. The top of the diaphragm 50 is normally pressed on by the lower enlarged end 55 of a rod or stem 56 extending centrally in the nipple 53 and passing through a cap 57 screwed or otherwise secured to the nipple 53. On the lower end or head 55 of the rod or stem 56 rests the lower end of a spring 58 extending within the nipple 53 and engaging a seat 59 swiveled on the under side of the cap 57. By screwing the cap 57 down or up on the nipple 53 the tension of the spring 58 can be regulated, and after the desired adjustment is made the cap 57 can be locked and sealed by a suitable locking and sealing device A, if it is desired to do so in cases where unskilled laborers are employed, who might tamper with the adjustment. It is understood that by the arrangement described a set spring device is provided whereby the diaphragm 50 is alive, lively and resilient at all times. The construction thus far described is practicaly the same as the one shown and described in the Letters Patent of the United States, No. 1,308,638, above referred to, and hence the construction involves no new features.

The rod or stem 56 projects a distance above the top of the cap 57 and is pivotally connected with an equalizing lever 60 forming part of a governing device 70 arranged as follows: One end of the equalizing lever 60 is fulcrumed on a bracket 71 attached to the cap 30, and the other end of the equalizing lever is pivotally connected with the upper end of a rod or stem 72 engaging at its lower end 73 a diaphragm 74 held in a fluid chamber 75 attached to or formed on the cap 30. The top of the lower enlarged end 73 of the rod or stem 72 is engaged by a spring 76 abutting with its upper end on a seat 77 swiveled on the under side of a cap 78 screwing on a nipple 79 screwed or otherwise secured to the body 80 of the governing device 70. It will be noticed that by the arrangement described an adjustable spring pressure device is provided for the top of the diaphragm 74 and which is wholly independent of the adjustable spring pressure device for the rod or stem 56 of the regulator 11. Thus the spring 76 of the governing device 70 may be set to any predetermined pressure and locked in said set condition by the locking means indicated at B.

Figure 2:
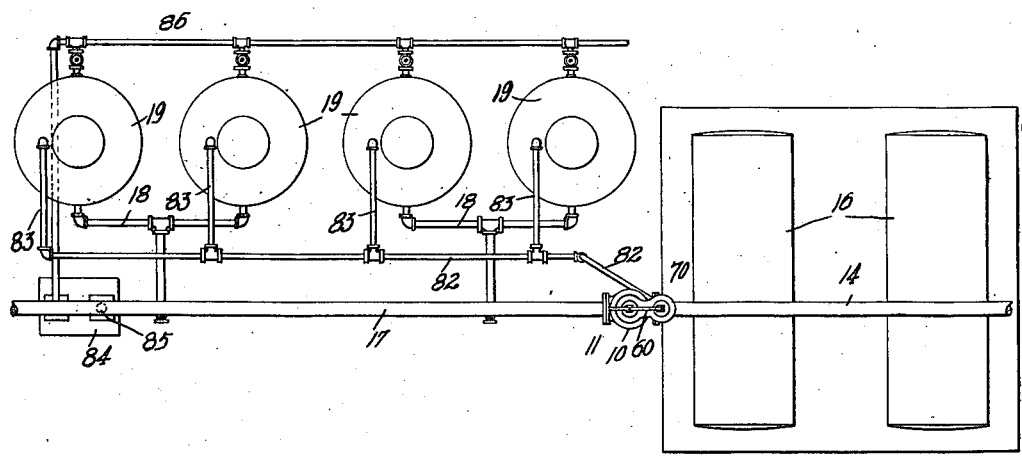
Figure 2 is a plan view of the same.

The chamber 75 is provided with a plug 81, preferably in the form of a screw plug and connected by a pipe 82 with a pressure supply such as steam, air or other fluid. As shown in Figures 1 and 2, the pipe 82 is connected by valved branch pipes 83 with the vacuum chambers of the several receivers 19. It is understood that the vacuums in the said several receivers are controlled by a vacuum pump 84 driven by steam delivered from the pipe 17 to the vacuum pump 84 by a valved branch pipe 85. The vacuum pump 84 is connected by valved branch pipes 86 with the vacuum chambers of the receivers 19, as plainly shown in Figures 1 and 2. It is understood that the plug 81 forms a stop for the middle portion of the diaphragm 74 to rest on when moved into lowermost position. The upward movement of the enlarged lower end 73 of the rod or stem 72 and that of the diaphragm 74 is limited by a stop flange 90 formed on the body 80. A valved pipe 91 leading from an oil supply is preferably connected with a chamber 75 to admit oil on top of the water in the chamber with a view of cushioning the diaphragm 74.

In use and operation the auxiliary regulator or governing device 70 operates in the following manner to influence the main regulating device or pressure regulator 11. Assuming that steam has entered the main pressure regulator 11 and that the cap 57 thereof has been adjusted to properly set the spring 58 for a predetermined pressure and that said cap is locked or sealed in this position, no changes of the delivery pressure above the maximum set will take place in the pipe 17, except as hereinafter explained. Assuming now, therefore, that through condition necessary to practical results, it is desired to increase the amount of steam to the receivers 19 without disturbing the original setting of the main pressure regulator 11; the said increase is accomplished in the following manner. The spring cap 78 is screwed down after the lock B has been released thereby compressing the spring 76 which rests on the lower enlarged end 73 of the rod or stem 72 connected to the equalizing lever 60. This simultaneously swings the lever 60 downward and moves the enlarged end 55 of the stem 56 downward against the diaphragm 50 which diaphragm in turn engages the upwardly extending stem 43 of the controlling valve 40 to open the same. The opening of the controlling valve 43 in turn effects the opening of the main valve 21 to admit more steam to the pipe 17. Thus it will be observed that the increased resistance afforded by the above described setting of the spring 76 of the auxiliary regulator 70, prevents the pressure at the throat or outlet 13 of the main valve from moving the diaphragm 50 upwardly until the new required pressure has been obtained in the receivers 19 and until the said pressure reaches the fluid chamber 75 through the pipe 28 to act on the diaphragm 75, which effects an upward movement of the stem 72, lever 60 and the stem 56. It will thus be seen that the new setting of the auxiliary adjusting device 70 nullifies the main pressure regulator 11 temporarily or until the required increase in pressure is obtained in the receivers 19. When the desired pressure or volume has been obtained in the receivers 19, the cap 78 may be unscrewed and the pressure is then regulated by the main regulating device under its original locked setting.

It is understood that I do not limit myself to the particular use of the regulating and governing apparatus, as shown and described, as the apparatus is applicable as a most efficient fluid or air governing device of any kind.

It is also evident that it may be applied, for instance, for setting the predetermined pressure of any receiver of steam, air or fluid, setting first the fluid chamber at a pressure carried in the receiver, and the regulator in accordance with the same will supply the fluid of the pressure to the receiver and maintain same, irrespective of outlet pressure at throat of regulator. This in many cases is important where, for instance, receiver or fluid chamber connecting is located far from the regulator. It will take, in this way, care of drop of pressure due to long line of pipe. It is evident that in this connection neither the springs nor the diaphragm need to be the same size in each fluid pressure chamber. In an apparatus of this kind it is necessary that every means possible be taken to prevent them from getting out of order, and therefore must be simple of construction, must be capable of easy inspection, and they must, above all, be sensitive and as responsive to any change of working conditions as it is possible to make a device.

This is of paramount importance when the result is considered not only to property but even to life, should an apparatus of this kind fail to work when depended upon. Engines, pumps, and receivers of the largest power plants might be destroyed. While this device is usable with low pressures it is identified and intended to apply to high pressures and in many cases very large receivers and, therefore, the importance of my application, in view of the facts stated above, is readily seen, as no stuffing box of any kind, either under steam or any other fluid connection is used to reduce the sensitiveness of the apparatus, allowing an absolute free movement of the parts. It is as sensitive as a scale, as all parts governing impulse are in equalization.

The important condition of the principle of this improvement is that the two diaphragms, although acting and co-ordinating together to accomplish the functions required, are not rigidly connected, but located side by side, each one is independent in its movement therefore flexible and resilient, made of different material, if necessary. In setting the adjusting device whatever difference may be in their resiliency, due to the causes referred to being connected through resilient spring members, the highest flexibility that can be produced is obtained, the co-ordination of all the parts making this possible, and, therefore, a most sensitive device is made, suitable to most conditions met in service.

It is evident that by the arrangement shown and described, a combined regulating and governing apparatus is provided comprising a fluid pressure regulator which controls a fluid under pressure, and a governing device which is controlled by another fluid, but the latter is resultant from the activity of the regulator controlled fluid.

Having thus described my invention, I claim as new and desire to secure by Letters Patent:

1. A device of the character described including a fluid pressure regulating device, a diaphragm for controlling said device, a casing, a second diaphragm within said casing, an adjusting spring regulating means associated with each of said diaphragms, an equalizing means connected to said regulating device, and fluid pressure means acting upon one of the faces of each of said diaphragms.

2. A device of the character described including a pressure regulating device, means providing a pair of separate fluid chambers, a diaphragm within each of said chambers, said diaphragms being positioned in substantially the same plane, a fluid pressure acting upon one of the faces of each of said diaphragms, adjustable means located beyond said diaphragms and contacting with the opposite faces thereof, said means counter-acting said fluid pressure and regulating stop means for said counter-acting means.

3. A device of the character described including a casing providing a chamber, a diaphragm within said chamber, a pressure regulator controlled by said diaphragm, a further casing providing a chamber, a diaphragm within said second chamber, adjusting spring devices for each of said diaphragms, a lever extending between said devices, said diaphragms being disposed in substantially the same plane, and each adapted to have one of the faces acted upon by a reduced motive fluid, and the other from a source of regulated delivery pressure.

4. A device of the character described including a pressure regulator, a diaphragm within said regulator and adapted to control the motive fluid, adjusting means on said diaphragm, a separate fluid chamber, a diaphragm within said chamber and adapted to have one of its faces acted upon by a fluid under pressure, adjusting and counteracting means associated with the opposite face of said diaphragm, both of said diaphragms being located in substantially the same plane, and regulating means acting upon one of the faces of each of said diaphragms whereby the same may be locked against accidental movement.

5. A device of the character described including a pressure regulator, a diaphragm associated with said pressure regulator, a fluid chamber provided adjacent to said regulator, a diaphragm positioned within said chamber, a casing associated with each of said diaphragms, a resilient member within each of said casings, adjusting caps for each of said members, lifting and depressing rods separating the resilient members, and fulcrumed connecting means attached to said rods, said device being adapted to have fluid under pressure from different sources acting upon one of the faces of each of said diaphragms.

JULES P. METZGER.